(12) United States Patent
Hurst et al.

(10) Patent No.: US 7,952,564 B2
(45) Date of Patent: May 31, 2011

(54) MULTIPLE-TOUCH SENSOR

(76) Inventors: G. Samuel Hurst, Knoxville, TN (US); Robert J. Warmack, Knoxville, TN (US); Rufus H. Richie, Oak Ridge, TN (US); Donald W. Bouldin, Brentwood, TN (US); David Ritchie, Peachtree City, GA (US)

( * ) Notice: Subject to any disclaimer, the term of this patent is extended or adjusted under 35 U.S.C. 154(b) by 891 days.

(21) Appl. No.: 11/356,431

(22) Filed: Feb. 16, 2006

(65) Prior Publication Data

US 2006/0197752 A1    Sep. 7, 2006

Related U.S. Application Data

(60) Provisional application No. 60/653,893, filed on Feb. 17, 2005.

(51) Int. Cl.
*G06F 3/041* (2006.01)
(52) U.S. Cl. ........................................................ 345/173
(58) Field of Classification Search .................. 345/156, 345/173–178; 178/18.01–18.09, 20.01
See application file for complete search history.

(56) References Cited

U.S. PATENT DOCUMENTS

| | | | |
|---|---|---|---|
| 4,914,624 A | 4/1990 | Dunthorn | |
| 5,003,505 A | 3/1991 | McClelland | |
| 5,194,862 A | 3/1993 | Edwards | |
| 6,650,319 B1 * | 11/2003 | Hurst et al. | 345/173 |
| 6,677,932 B1 | 1/2004 | Westerman | |
| 7,339,580 B2 * | 3/2008 | Westerman et al. | 345/173 |
| 2003/0063073 A1 | 4/2003 | Geaghan et al. | |
| 2003/0214485 A1 | 11/2003 | Roberts | |
| 2004/0001048 A1 | 1/2004 | Kraus et al. | |
| 2004/0017362 A1 * | 1/2004 | Mulligan et al. | 345/173 |

* cited by examiner

*Primary Examiner* — Srilakshmi K Kumar
(74) *Attorney, Agent, or Firm* — Michael E. McKee

(57) ABSTRACT

A touch sensor method and device are described that allow one or more simultaneous touches to be sensed and mapped to Cartesian coordinates. The device utilizes closely spaced multiple conducting strips to provide digital location of a touch position according to the position strip and analog location along the length of the strip. When the strips are energized individually and in coordinated ways, multiple touches are individually sensed and their positions are reported.

27 Claims, 6 Drawing Sheets

| Resolution | Maximum Number of Cycles: One Touch | Maximum Number of Cycles: Two Touches |
|---|---|---|
| 1024 | 10 | 20 |
| 512 | 9 | 18 |
| 256 | 8 | 16 |
| 64 | 6 | 12 |

Fig. 4

| Comparison of conventional touchscreen and Digalog operation for a single touch ||||
|---|---|---|---|
|  | Energy | Resolution | Cycle time |
| 5-wire | 400 nJ |  | 20 μs |
| Digalog | 133 nJ | 1024 | 100 μs |
| Digalog | 33 nJ | 256 | 80 μs |
| Digalog | 8 nJ | 64 | 60 μs |

Fig. 5

Send and Receive Unit

MULTIPLE-TOUCH SENSOR

RELATED APPLICATIONS

The benefit of Provisional Application Ser. No. 60/653,893, filed Feb. 17, 2005 and entitled MULTIPLE-TOUCH SENSOR, is hereby claimed. The disclosure of this referenced provisional application is incorporated herein by reference.

FIELD OF THE INVENTION

The field of the present invention relates to touch sensor technology, and more particularly to resistive and capacitive touch sensor technology for multiple touches simultaneously.

BACKGROUND OF THE INVENTION

Technological advances are needed to connect man more effectively to machines of many types (such as computers, home appliances, and communication devices). The touch screen as conventionally developed enjoys wide use as a convenient device for providing finger contact as a "friendly" assistant that provides the user with a much easier access to the computer. Touch pads are also used to assist in communicating spatial and temporal data with computers and other programmed devices.

Touch sensors use an impressive array of technologies including acoustic, optical, resistive and capacitive and are typically coupled with display devices using transparent or translucent materials or are opaque structures when used independent of a computer. In nearly all cases, a single finger or single stylus contact is made with the sensor to input the data.

In this disclosure, a new design concept is introduced that provide a means to allow multiple contacts to a touch sensor, enabling the user to communicate more effectively and efficiently to other devices.

Touch screens have been developed over the past few decades and are widely used. Commonly a two-dimensional substrate is used, typically using glass coated with a transparent conductor, wherein electrical fields are applied sequentially in the x and y directions. To obtain electric fields that are uniform enough for touch screen uses, it is necessary to border the entire surface with various kinds of conducting frames to ameliorate the field distortions. In some cases a correction algorithm is used to achieve further accuracy and to make possible narrow inactive edges. For a recent summary of these methods, see U.S Pat. No. 6,650,319, by Hurst et al. In a resistive touchscreen, a flexible cover sheet allows electrical contact to be made with the substrate, and potential measurements are made to determine the contact position. In a capacitive touchscreen, capacitive coupling is made between a finger and an electrically activated touch sensor. Current, voltage, or resistance ratios are generally used to determine the contact position.

Generally, the touch screen acts to provide the coordinates of a single touch on the sensor surface, i.e. only one touch point is sensed at any one instant in time. Multiple touches cause erroneous data. However, a number of important needs cannot be met with the limitations of a single touch. Familiar operations such as the use of the "Shift" or "Ctrl" keys on a computer keyboard cannot be directly used on present touchscreens due to this limitation. The operation of a right-click of a computer mouse becomes a multi-stroke operation on conventional touchscreens. Chording for musical keyboards is not possible because of the limitation of single-touch screens. The gaming industry could enjoy increased flexibility in game design and operation with the advent of sensors that allow multiple touches. Thus there are possibly substantial markets for multi-touch devices where one or more fingers are used at the same time, thus there is a need for multiple-touch sensors. This document discloses a new concept for meeting these and other needs. Such sensors that allow multiple touches to be sensed and located are termed "Multi-Touch."

Additional needs are not related to human touch, but rather to contact with some mechanical object placed on a sensor. For example, the identity and orientation of a component placed upon a sensor would be useful in a robotic manufacturing operation. The extension of MultiTouch to such an application is termed "TransTouch."

This document discloses a new concept for meeting these needs. The Digalog concept is one in which one Cartesian axis is measured with an analog method and the other axis is measured with a digital method. This concept yields very simple geometries for the layout of conductive areas onto insulating substrates. Very satisfactory spatial resolution, time resolution, and low energy consumption, are achieved with modest electronic controllers at moderate cost. While these sensors can be used to locate a single touch, a most significant advantage is that they can be used to measure many simultaneous touches. This general approach can be adapted to a variety of touch sensors for many kinds of applications. It is especially interesting to explore the applications of these multiple-touch sensors to areas where combinations of hand fingers can be used advantageously, e.g., home appliances, security, and stationary or portable computers. Additionally, these MultiTouch screens can be advantageously used in systems that connect encoded messages, such as Braille, to the Internet and email.

Other multiple-touch sensors have been described in the patent literature. For instance, U.S. Pat. No. 6,723,929 by Joel Kent is entitled, "Acoustic Condition Sensor Employing a Plurality of Mutually Non-Orthogonal Waves." In the standard Surface Acoustical Wave (SAW) technique, ambiguities arise when the sensor is touched at more than one point. These can be resolved for two or more points when using the non-orthogonal waves. SAW sensors have the advantage of high optical transparency, since the working surface is only glass but are known to be subject to errors caused by contamination.

The self capacity principle has also been used to achieve multi-touch capability. This type of multiple-touch sensor was pioneered for typing and handwriting primarily by Westerman (see U.S. Pat. Nos. 6,677,932, 6,570,557 and 6,323,846). These patents are assigned to Finger Works, Inc, founded by Westerman at the University of Delaware. Advanced typewriters are based on these capacitance touch screens and a form of Bayesian analysis is used to deal with typing errors. Multiple-finger strokes, called "gestures," are used to facilitate communications of a person with an associated processor. The system does not offer transparency for use with touch screens over display devices.

U.S. Pat. No. 5,194,862 by Edwards is based on idea of an array of bistable thin-film sensing elements that are activated by touch to obtain x-y coordinates for a multiplicity of touch points. Edward's concept uses one bi-stable sensor for each pixel that is interrogated and is reset by scanning the rows and columns. A grounded stylus or finger causes each proximal bi-stable circuit in the area to switch states. Thus, multiple touches would set a number of these switches, which would then be read out.

SUMMARY OF THE INVENTION

The present invention are directed to a touch sensor system that comprises a touch sensor and a controller that allow multiple touches to be sensed and their locations to be determined (termed "MultiTouch"). The touch sensor can be transparent, translucent or opaque, depending upon the intended application. The touch sensor further comprises a set of electrodes and conductive bands coupled to the touch region. An electronic controller is attached to energize and read the coordinate locations and to provide data to a host computer or information processing system. The concept is called "Digalog," which refers to reading coordinate pairs by obtaining digital information for one axis and analog for the other.

It is therefore a purpose of the invention to provide an improved touch sensor that allows single or multiple touches to be sensed and individually located.

BRIEF DESCRIPTION OF THE DRAWINGS

FIG. 4 illustrates the number of cycles required to obtain a selected digital resolution.

FIG. 5 compares the energy required and cycle time for a conventional 5-wire resistive screen with the Digalog screen at selected resolutions.

DETAILED DESCRIPTION OF THE PREFERRED EMBODIMENTS

Figure 1:
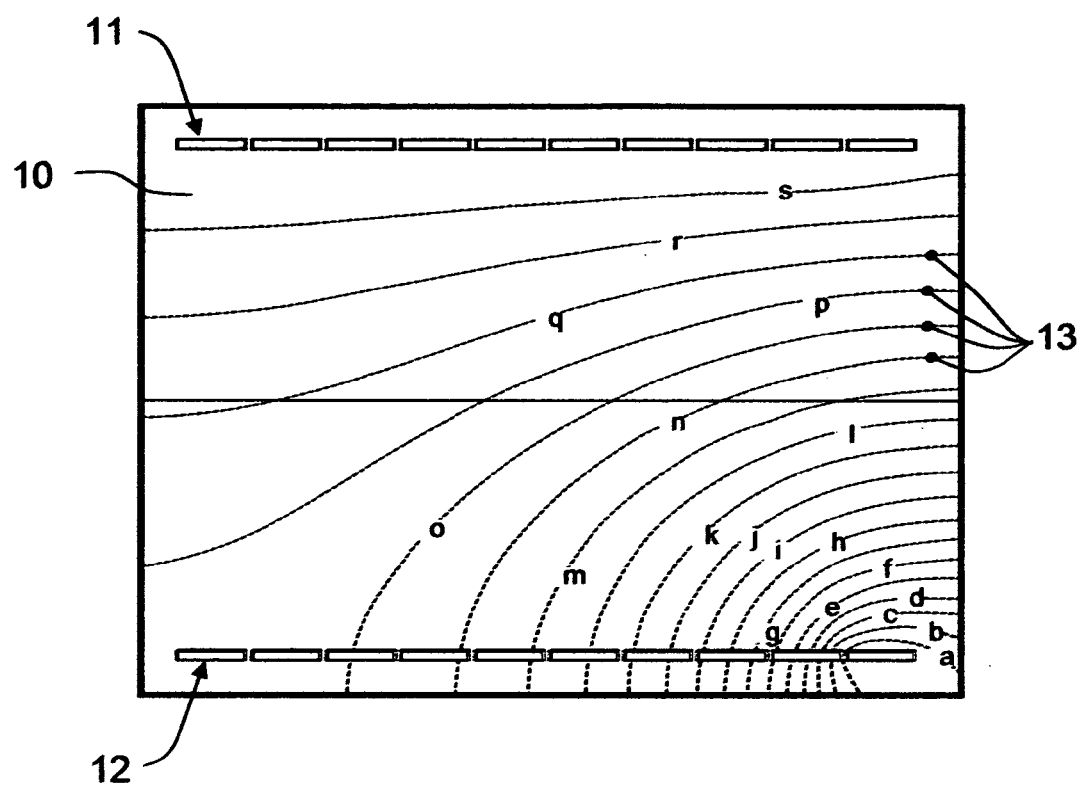
FIG. 1 shows a resistive sensor with multiple electrodes. Equipotential representations are given for a single energized electrode on the lower right.

Several designs of touch screens are described to illustrate the flexibility of the Digalog concept. In each case, use is made of a surface which is made electrically conductive with a suitable coating, e.g. indium tin oxide (ITO), and an electrically conductive cover sheet that can be brought into contact to make potential or current measurements. An illustrative design is shown in FIG. 1, even though it does not have MultiTouch capability, and furthermore, it is not a likely competitor for present single-point touch screens. This design would use two arrays of electrodes 11 and 12 on as resistive surface 10. The simplest switching logic to use with this design would be one in which the top electrodes 11 of the sensor are held at a single constant potential and the bottom electrodes 12 are energized individually at a different potential. The potential contours 13 are nonlinear as shown by one example in FIG. 1. In principle, the location of a single touch can be determined by its potential as a function of the electrode energized. This design is not satisfactory, since it is limited to single point operation, due to current flow between any two points connected with the conductive cover sheet. Thus, there is no hope for a multi-touch function with this design. Furthermore, to determine the location of a single touch point, the individual lower segments would have to be scanned, for example, by grounding each of the small segments one at a time while leaving all the others floating. In other words, this simplest attempt to use the Digalog concept would be implemented by measuring the potential at a particular point while each strip is activated and then determining the extreme potential to find the nearest electrode. The distribution of equipotentials, as shown in FIG. 1 for one activated electrode, would cause the determination of coordinates of the touch to be unreliable. The combined deficiencies of single point measured, the need for an elaborate scanning logic to find the extreme potential, and the relatively high power consumption are serious limitations in this design. While the scheme could be used in principle to obtain single touch points, it most likely will not be competitive with existing single-point technology.

Figure 2:
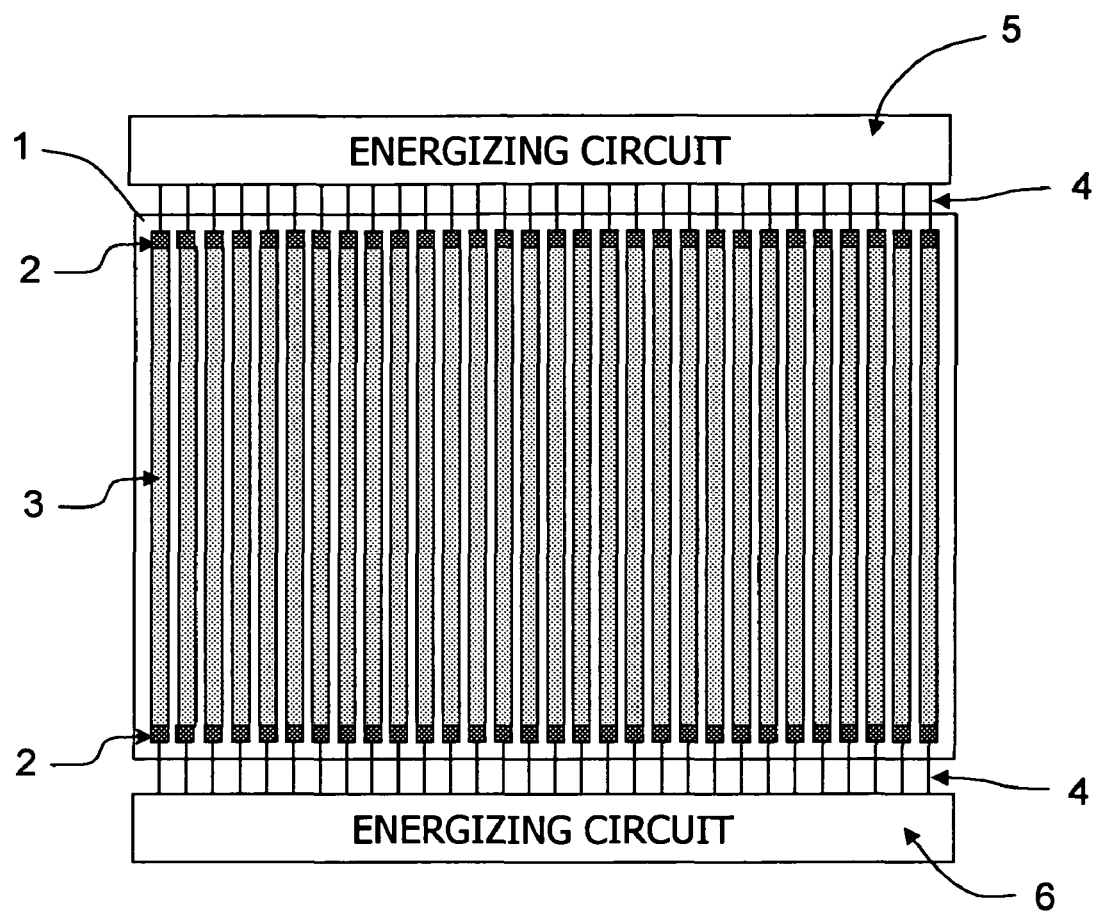
FIG. 2 is a depiction of a Digalog touch sensor with connections to associated energizing circuits.

A much more promising design is illustrated in FIG. 2, where all segment pairs are now electrically isolated from each other with an insulating line between them. The touch sensor is comprised of a substrate 1, and a set of conducting bands 3, which are insulated from one another and which are individually connected to electrodes 2. In a preferred embodiment, the substrate 1 is transparent and may be composed of glass, plastic or another insulating material. In this embodiment, the conducting bands 3 are also transparent and may be composed of conducting tin oxide that is applied to the substrate. Electrodes 2 provide electrical connections to the ends of the conducting bands 3 and may be composed of metals, such as gold, chromium, nickel, silver or other highly conductive material that may be required to obtain a good electrical connection to circuits 5 and 6. Conducting leads connect the electrodes 2 to circuits 5 and 6, which energize individual and groups of conducting bands 3. This design readily achieved by using modern patterning techniques.

In one preferred embodiment, the touch sensor is configured with a conducting cover sheet that comes into electrical contact with the bands at the touched areas. Coordinates are determined along an axis perpendicular to the bands by the presence or absence of an electrical signal on the cover sheet as the conducting bands are sequentially energized by an external controller. The orthogonal coordinate or location along each band that is in contact with the cover sheet is determined in an analog fashion. Sequential activation of the bands in coordination with amplitude measurements allows simultaneous plurality of contacts to be individually mapped.

Figure 3:
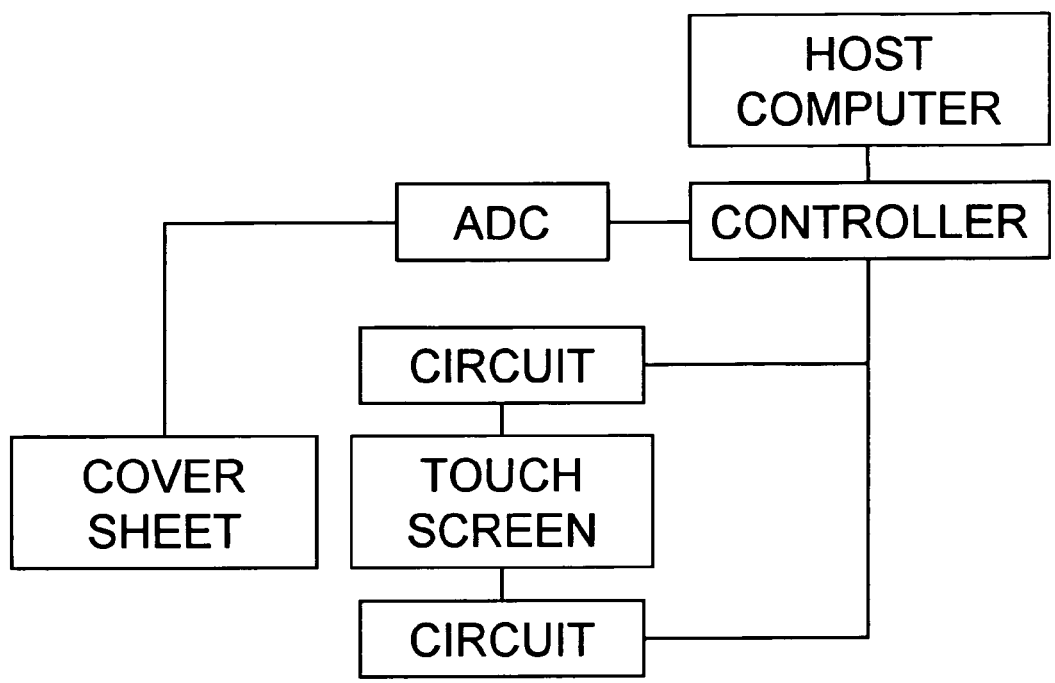
FIG. 3 is an interconnection diagram of a resistive Digalog touch sensor system.

In this embodiment, a cover sheet, shown in FIG. 3, is attached to the touch sensor, such that it is electrically insulated from surface of the touch sensor, and is allowed to come into contact at points under gentle pressure from fingers or other objects. One method for obtaining the analog information would be to measure the amplitude of electrical signal on the cover sheet as a measure of the voltage drop along the conducting band 3. A controller causes energizing circuits 5 and 6 apply potentials across the individual conducting bands 3 in a sequential manner. As each band is energized, the controller directs the analog-to-digital circuit (ADC) to measure the voltage on the cover sheet. The ADC comprises a voltage measuring circuit and a bias voltage that allows a determination to be made of 1) contact between the cover sheet and the energized band and 2) the potential of the point-of-contact with the band. If contact is ascertained by the voltage measurement being in the range of potential applied to the band, then the x-coordinate of the contact point is recorded as associated with the x-position of the band thus energized. Otherwise, the band is de-energized and another band is energized to test for contact. When contact is ascertained, the y-coordinate is recorded as associated with the magnitude of the voltage recorded. For example, if the conducting bands are uniform in width and resistivity, the contact position is linearly related to voltage measured. The process is continued until the entire touch screen or region-of-interest has been examined. In this way, multiple contacts between the cover sheet and the touch sensor can be ascertained and located.

Another analog method of this embodiment would be to measure the current delivered to each end of the conducting band 3, which is biased at a potential different from the cover sheet. The proportional position of contact along the band is related to the current ratio in a straightforward manner; and from Ohm's law, the resistance between the two points of contact on a selected band could be reported as well.

In a manner of speaking, this produces a large number of one-dimensional vertical touch screens lined up above the x-axis, for example. Because of the electrical isolation, there is no current flow between the conducting bands 3 even when a continuous cover sheet is used to make multiple contacts. Also note that in the design shown in FIG. 2, if fingers are used normally, being distributed generally perpendicular to bands, it is unlikely that more than one touch will be seen on each small vertical touch screen at the same time. In the unlikely case that one finger touch region overlaps an adjacent finger touch region, the overlapping region will produce a signal that is the average of the two finger signals. However, the finger locations can be fully resolved by the non-overlapping regions. Additionally, the lateral width of the finger contact, which is a function of the finger size and pressure, is also available.

A number of scanning methods are available to determine the x (digital) coordinate quickly. If only a coarse resolution is needed, then lines can be grouped together and treated as one average value of x. Where the greater resolution is desired, all lines are scanned in smaller groups or individually. In this manner, the widths of the contacts can be determined. If a single touch is anticipated, the touch sensor can in a binomial search. For example, one half of the screen could be tested for touch contact as a group, followed by tests on smaller groups of conducting bands 3. By systematically testing the appropriate half of the previous group of conducting bands, it can be seen that the number of tests required is just the logarithm to the base two of the digital resolution. For example, by using 1024 bands at their full resolution, ten tests are needed to determine the location of a single point. Likewise, for multiple contacts, the binomial search would be extended for each region where touch contact is indicated. Thus, the number of tests increases proportionately to the number of touches. This is illustrated in FIG. 4 for one and two touches. With this design, it is also possible to truncate the scans to obtain limited resolution along the x coordinate and to decrease the energy consumption and overall time required to determine all touches.

The cycle time or time to record each touch is an important specification in any touch screen method and is especially significant in MultiTouch where a number of points must be sensed. The cycle times are examined in FIG. 5, assuming that the dominate delay is given by a single ADC conversion time, which is illustrated as 10 microseconds. For all practical circumstances, it may be assumed that the cycle time can be less than 1 millisecond, even for the case of as many as ten contacts made using both hands at the same time. This time is quite adequate for typing speeds and the recording of cursor-drag operations.

Another major concern in touch sensor technology is energy consumption, especially in portable applications. Using ordinary conductive, transparent material (doped tin oxide) with 200 ohms per square, the individual elements of a Digalog sensor have high resistance and low power consumption. FIG. 5 also shows the energy consumed by the touch sensor in digitizing a single touch. The energy consumption during one measurement cycle can be used for a proper comparison between two sensors employing different technologies. As a simple example, let us assume that the complete measurement period for applying a voltage to a screen element and waiting for settling and analog-to-digital (ADC) conversion is 10 microseconds. With a conventional five-wire touchscreen, two conversions are required to complete a measurement cycle. With the conventional screen biased at 1 volt, the energy required would be 400 nanojoules, neglecting capacitive and resistive losses and internal power consumption by the control electronics. For a Digalog sensor with similar resistivity (200 ohms per square), whose size is 256 mm×192 mm and having 256 channels of lateral resolution (0.5-mm conducting bands), only 33 nanojoules would be consumed—a factor of twelve reduction. For 64 channels with the same strip widths, this drops to 8 nanojoules—about 50 times less than that of a conventional touchscreen.

A number of options are available for the controller electronics with the Digalog concept, depending on the packaging desired. For instance, the controller could be entirely external to the touch screen. This external controller would connect each end of the individual isolated strips to a voltage source in a timed sequence in which each analog measurement is made. An attractive alternative would be to incorporate transistor switches and control logic on both ends of the individual sensor strips, as a part of the sensor. This arrangement could allow fewer control lines to be attached to the sensor in which part of the controller activates individual and groups of strips to gain both digital and analog information. This information can give the location of all the points touched in a cluster (i.e., set of multiple touches). Furthermore, the power supply and the control electronics could be installed in the screen housing. This would enable a simple data link that inputs directly to the host computer.

In another preferred embodiment, a dielectric film is applied to surface of the touch sensor, and capacitive coupling is employed between finger touches and the touch sensor. In this case, the bands are energized with an oscillating or switched voltage. Current delivered to each end of each band is monitored. If a capacitive load is present due to the touch of a finger over the band, then a touch to that band is ascribed and the x-position of the touch is recorded. The proportion of current delivered to each end of the activated band is used to determine the y-position. Additional bands are activated to test for other contacts. The process is continued until the entire touch screen or region-of-interest has been examined. In this embodiment, an electrically conductive guard layer, for example on the opposing side of the touch sensor, may be usefully employed to avoid capacitive loads to adjacent objects. A guard layer is commonly used in commercial capacitive touchscreens.

There are a number of general areas of applications of MultiTouch screens where the Digalog method might be advantageously employed to replace conventional keyboards. For example, one might expect a convenient remedy for the right-click deficiency of a conventional touchscreen "mouse." Using the index finger to move the screen mouse, the drop of the middle finger, for example, would signal a right-click. Elimination of separate keyboards would prove very useful for many applications. The layout of a notebook computer could be totally revised. Another hardware advantage is the use of a keyboard that could be sanitized for use in dental or medical environments. An optical keyboard, based on the Digalog principle would be much easier to sanitize than a conventional mechanical system with its many keys.

Telephone dialing is another specific example of the Dialog MultiTouch. In situations of dim visibility where a number pad cannot be clearly seen, the advantage of finger inputting at any place on a reasonable size screen is clear. Furthermore, MultiTouch is far more practical than would be single-touch, as it requires less time and is less prone to errors.

These hands-on input techniques could be extended to home appliances. As a trivial example, a microwave-oven setting of 25 seconds is made by simply touching a screen two times with all 10 fingers and one time with five fingers. (This procedure is far better than finding small number pads, especially in the dark!) The use of appliances by the military under very difficult circumstances would also be facilitated by simplifying input commands.

Moreover, if the appliance code is written in a binary system, the use of fingers is advantageous. Suppose the appliance uses a binary code and that the thumb on the right hand is a reference point of value 0, then the index finger is 1, the middle 2, the ring 4, and the little finger is 8. Then all fingers touching could mean 15 seconds for example and the same on the left hand could mean up to 15 minutes. Rapid use of the right hand three times could quickly program 45 seconds. And on the left hand four separate placements of all four fingers could be a command for 1 hour. And, if fine tuning is needed, the combinations of fewer than all four fingers could be used. For example, 3 minutes would use the left thumb and the index finger with the middle finger; 7 seconds would be the right thumb, along with the next three fingers. Note that it is not necessary to know the location of the hands on the touch sensor, since all necessary information is contained in the relative positions of the touch points.

It is especially interesting that with the "hands-on-screen" method using Digalog MultiTouch principles in the design of sensors would have useful secured-entry features. For instance in point-of-sales, menus would not be open to anyone not having the information on how the hand (combination of fingers, or gesture) must first touch the screen to get a menu response. Applications in more important areas could include vaults, safes, limited-access work areas, and home security. It is natural to consider a wide spectrum of security applications. This follows from the fact that there are a large number of possible combinations in codes that are easy to remember and to use rapidly in emergencies.

Figure 6:
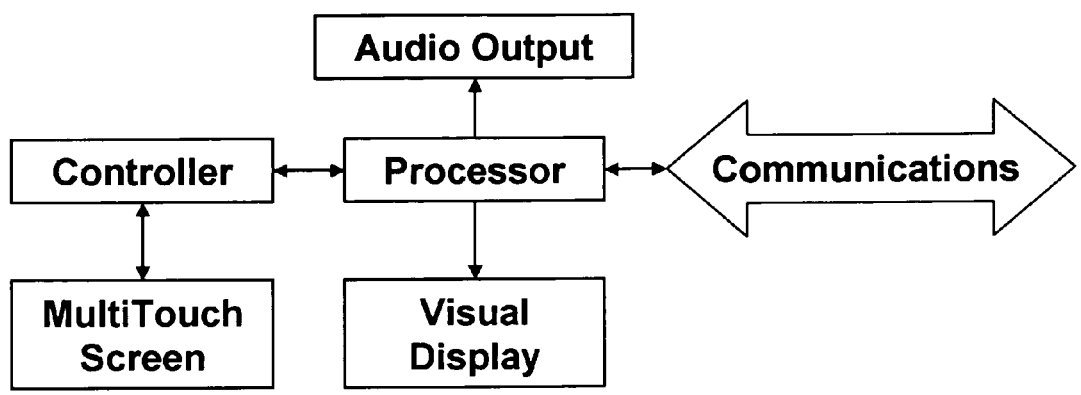
FIG. 6 illustrates a Send and Receive Unit composed of a MultiTouch screen together with a processor with visual display and audio output.
Figure 7:
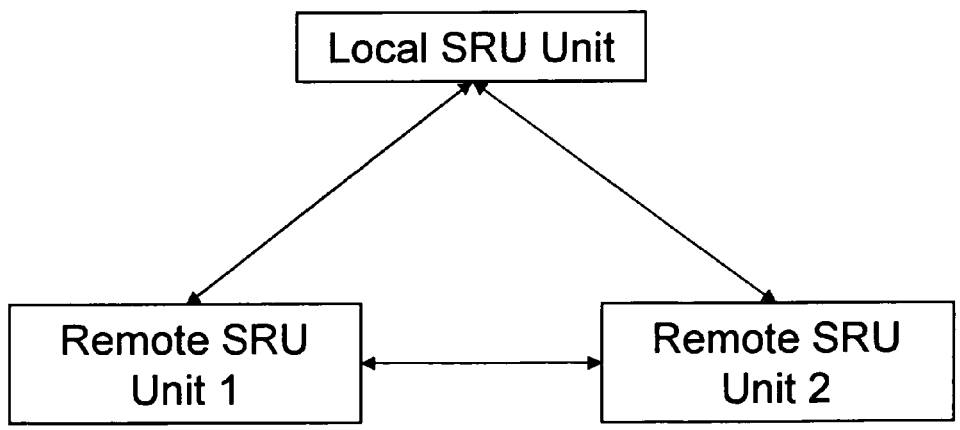
FIG. 7 illustrates a local Send and Receive Unit in communication with remote Send and Receive Units.

One interesting application of multitouch will be described in more detail. FIG. 6 illustrates a Send and Receive Unit (SRU) that incorporates a MultiTouch screen to communicate with local and remote systems using schemes such as the Internet. The controller sends signals from operator interactions with the touch screen to the processor. Typing, for example, could be done without regard for absolute positioning of the keys. The processor would convert these coded signals to an audio output unit and/or to a visual display unit before transmission to the internet. The audio and video provides confirmation to the operator that his instructions were properly understood. These encoded instructions could then be communicated to another SRU. As an example of such a facility, an individual working in total darkness uses fingers to input a coded message. An audio signal is available to monitor the message, if desired or a visual message could be created on a display or printed onto paper. The message is then received by another individual with either the visual or audio option. As a specific example, assume that the sending individual is blind, in which case the code might advantageously be in Braille. As Braille is a two-column by three-row coding system, a MultiTouch system could incorporate a two-handed method of input using three fingers (rows) on each hand (columns). Alternatively, a one-handed method that uses two successive strokes with the thumb indicating the column could also be used. The receiving individual could be blind also and could receive the voice translation made by the processor. If sighted, either voice or visual translations are alternatives.

While an example has been given where the blind could use a Braille code, other applications are easily imagined, using Braille or other codes. In a wide variety of security systems, the SRU could communicate information directly to a secured vault, for example. Military operations and other environments do not allow illuminated displays or voice to be used. A MultiTouch SRU could facilitate such applications by allowing noiseless operations be done in total darkness.

Operations on two-dimensional images or data could be conveniently performed using MultiTouch to select regions-of-interest with one or more fingers, while selecting operations using menu buttons or gestures with other fingers. This avoids sequential operations necessary with single-touch sensors. Printed media could be overlaid on the sensor for this purpose or displayed on a video monitor with a transparent MultiTouch screen.

Still another interesting application of a MultiTouch sensor would be to facilitate the input of data without unnecessary distraction. For example, the operation of auxiliary devices like radios, cell phones or other electronic aids while operating a vehicle can be dangerous. A MultiTouch sensor could allow operation of these devices using touches and gestures without requiring the operator to visually distracted. One specific contemporary application is text messaging. Thus the system would let the driver watch the driving environment outside the vehicle and never have to visually search for the control. This enhancement safety would be due to the fact that the screen can be operated by hand without concern of the actual position of the hand. An added feature is that the operator (or a passenger) can be trained on the use of self-determined gestures when not operating the vehicle. Computer-assisted teaching is greatly facilitated with a transparent multi-touch screen capable of presenting the gesture and its word description on the same monitor.

The MultiTouch screen based on the Digalog concept has enormous opportunity for applications in the domain of human-computer interface where all the fingers can be involved. In another embodiment, the Digalog concept can be used as a way to input properties of objects placed on the sensor. Since this will not require a human touch in the usual sense we call this device the TransTouch screen. The design of FIG. 2 allows vertical digitization for a single touch along each vertical strip and is suitable for multiple-finger actuation. However in general, multiple touches that are directly vertically aligned will be recorded as an average. This is not a problem for fingers generally along the lateral direction, but there could be ambiguity in discerning certain object shapes. The design shown in FIG. 8 would manage contact points to resolve possible ambiguities.

Figure 8:
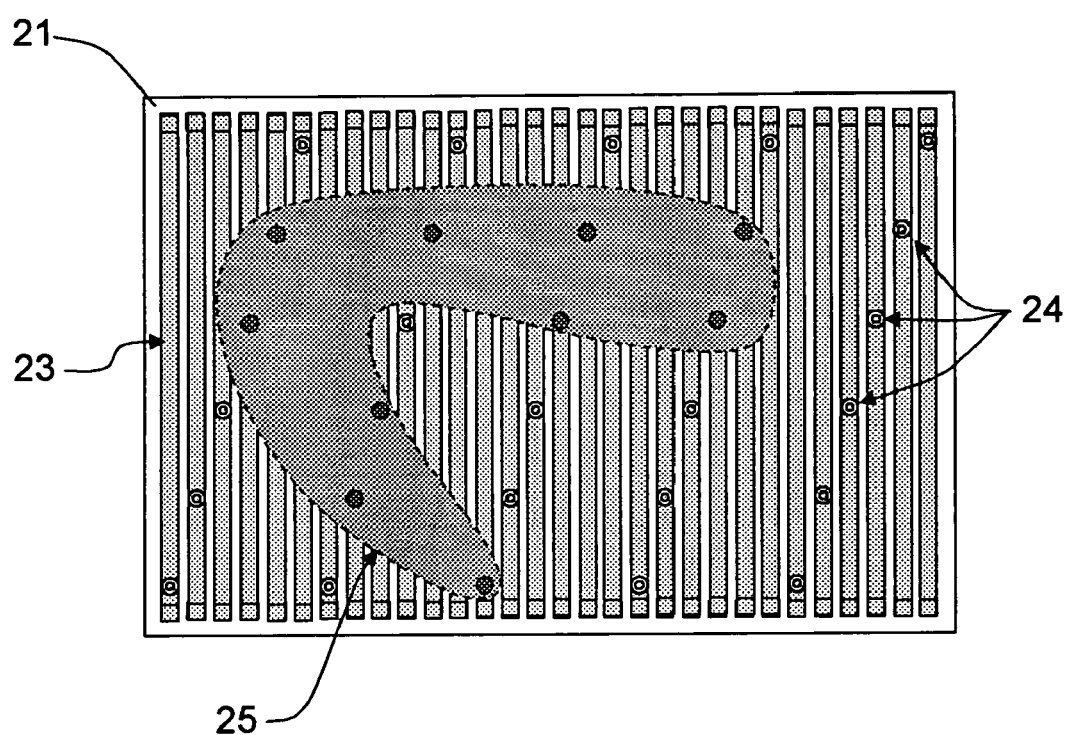
FIG. 8 illustrates a TransTouch sensor on which an arbitrary shaped object is placed.

TransTouch is intended to make possible inputs of shape, size and other physical features of an object placed on the sensor. The touch sensor in FIG. 8 is comprised of an insulating substrate 21, and a set of conducting bands 23, which are insulated from one another. An attached coversheet would have a set of insulating separator dots but would also have a set of smaller conducting dots 24 that are aligned over the conducting strips on the touch sensor. The conducting dots 24 would permit electrical contact to the conducting bands 23 only under direct pressure from an object 25 placed on the sensor. A simple layout would have one conducting dot 24 per strip, so that the lateral and vertical coordinates could be unambiguously determined for arbitrary shaped objects.

Some possible applications for TransTouch include drawing applications such as mechanical engineering, drafting, and graphic arts, such a sensor should save time as compared to other methods of determining and inputting the dimensions of both simple and complex objects. A number of applications come to mind for classifying and counting various types of objects. For example, TransTouch will be useful to robots that are picking up parts for assembly of products.

Although particular embodiments of the present invention have been shown and described, it should be understood that the above discussion is not intended to limit the present invention to these embodiments. Those of ordinary skill in the art will appreciate that various changes and modifications may be made without departing from the spirit and scope of the present invention. Thus, the present invention is intended to cover alternatives, modifications, and equivalents that may fall within the spirit and scope of the present invention as defined by the claims.

What is claimed is:

1. A multiple touch sensor which requires a conductive coupling internal of the sensor to effect a touch of the sensor, the multiple touch sensor comprising:
    an electrically insulating substrate having two sides and a touch region on one of the two sides;
    a plurality of electrically-conducting band segments coupled to and traversing the touch region and wherein the band segments are insulated from one another;
    a cover layer overlying the touch region and having two opposite sides;
    a controller providing an electrical means of sequentially energizing a plurality of the segments and an electrical means for monitoring the electrical characteristics of the touch sensor and for identifying the locations at which touch positions on the touch sensor are touched from the monitored electrical characteristics; and
    the cover layer has an electrically-conductive surface on one of its two opposite sides wherein the electrically-conductive surface is supported in an insulated relationship with the touch region but is capable of being moved into contact with the touch region and the band segments coupled thereto when external pressure is applied to the side of the cover layer opposite the electrically-conductive surface so that a touch of the sensor is effected by the conductive coupling between the touch region and the band segments when the touch region is moved into contact with the band segments; and
    wherein the controller is adapted to identify multiple locations on the touch region which are simultaneously touched upon movement of the cover layer into contact with the touch region at the multiple locations.

2. The touch sensor of claim 1, in which insulating spacers are positioned between the cover layer and the touch region to prevent electrical contact between the cover layer and the touch region unless external pressure is applied to a side of the cover layer as aforesaid.

3. The touch sensor of claim 1, in which the substrate, the band segments, and the cover layer are transparent over the touch region.

4. The touch sensor of claim 1 in which the cover layer is an insulating film.

5. The touch sensor of claim 1, which further comprises a conductive guard layer on the electrically insulating substrate on the side opposite the side of the touch region.

6. The touch sensor of claim 1 in which the controller provides a means of monitoring the current delivered to each end of the band segments for identifying the locations at which at the touch positions on the touch sensor are touched.

7. The touch sensor of claim 1 in which the controller provides a means of sequentially energizing a plurality of the said segments of the touch sensor with an oscillating voltage and monitoring the oscillating current at each end of the band segments for identifying the locations at which the touch positions on the touch sensor are touched.

8. The touch sensor of claim 1 in which the controller provides a means of monitoring the voltage delivered to the cover layer by each band or group of bands for identifying the locations at which the touch positions on the touch sensor are touched from the monitored voltage.

9. The touch sensor of claim 1 in which the controller provides an electrical means of sequentially energizing a plurality of the said segments of the touch sensor and sequentially energizes band segments of the touch sensor and electrically determines the coordinates of a plurality of touch positions on the touch sensor.

10. A multiple touch sensor system which requires a conductive coupling internal of the sensor system to effect a touch of the sensor system, the multiple touch sensor system comprising:
    an electrically insulating substrate having a touch region;
    a cover coupled to the touch region and having two opposite sides;
    a plurality of electrically-conducting band segments coupled to and traversing the touch region;
    wherein the cover has an electrically-conductive surface on one of its two opposite sides and the electrically-conductive surface is supported in an insulated relationship with the touch region but is capable of being moved into contact with the touch region and the band segments coupled thereto when external pressure is applied to the side of the cover layer opposite the electrically-conductive surface so that a touch of the sensor system is effected by the conductive coupling between the touch region and the band segments when the touch region is moved into contact with the band segments; and
    a means whereby touches upon the side of the cover opposite the electrically-conductive surface are used to encode information that is transmitted to an external system and whereby multiple locations on the touch screen which are simultaneously touched are identified upon movement of the cover layer into contact with the touch region at the multiple locations.

11. The system of claim 10 where the encoded information is generated in the complete absence of light.

12. The system of claim 10 where the code is Braille-based.

13. The system of claim 10 where the code is binary-based.

14. The system of claim 10 where custom codes are used to accommodate to the preference of the sender.

15. The system of claim 10 in which the external system includes a computer monitor.

16. The system of claim 10 in which the coded information is transmitted to an external system.

17. The system of claim 16 in which the information at the distant user's site is monitored and converted by a transducer to a useful form.

18. The system of claim 17 in which monitoring is done with an audio converter.

19. The system of claim 17 in which monitoring is done with a visual converter.

20. A multiple touch sensor system which requires a conductive coupling internal of the sensor system to effect a touch of the sensor system, the multiple touch sensor system comprising:
    an electrically insulating substrate having two sides and a touch region on one of the two sides;

a plurality of electrically-conducting band segments coupled to and traversing the touch region and wherein the band segments are insulated from one another;

a cover with an electrically-conductive surface that is supported in an insulated relationship with the touch region but is able to be moved into contact with the touch region upon application of external pressure to the side of the cover opposite the electrically-conductive surface so that a touch of the sensor system is effected by the conductive coupling between the touch region and the band segments when the touch region is moved into contact with the band segments; and a controller providing an electrical means of sequentially energizing a plurality of the segments and an electrical means for monitoring the electrical characteristics of the touch region and for identifying the locations of a plurality of touch positions on the touch region from the monitored electrical characteristics; and a means by which the weight of an object left on the cover will cause contact between the electrically-conductive surface of the cover and the electrically conducting band segments so that the shape of the object in contact with the touch region can be determined; and wherein the controller is adapted to identify multiple locations on the touch region which are simultaneously touched upon movement of the cover layer into contact with the touch region at the multiple locations.

21. The touch sensor system of claim 20, which further includes a predetermined pattern of insulating and conductive spacers positioned between the cover and the touch region to permit electrical contact between the cover and the individual electrically conducting band segments at only one point each.

22. The predetermined pattern of claim 21 in which the area pattern of the object is determined.

23. The predetermined pattern of claim 20 in which the weight distribution of the object is sensed.

24. A method for identifying the locations at which multiple touch positions on a touch sensor are touched, said method comprising the steps of:

providing a touch screen which requires a conductive coupling internal of the touch sensor to effect a touch of the sensor including:

(a) an electrically insulating substrate having two sides and a touch region on one of the two sides;
(b) a plurality of electrically-conductive band segments coupled to and traversing the touch region and wherein the band segments are insulated from one another;
(c) a cover layer overlying the touch region and having two opposite sides; and
(d) a controller providing an electrical means of sequentially energizing a plurality of the segments and an electrical means for monitoring the electrical characteristics of the touch sensor and for identifying the locations at which touch positions on the touch sensor are touched from the monitored electrical characteristics, and the cover layer has an electrically-conductive surface on one of its two opposite sides and wherein the electrically-conductive surface is supported in an insulated relationship with the touch region but is capable of being moved into contact with the touch region when an external pressure is applied to the side of the cover layer opposite the electrically-conductive surface so that a touch of the sensor is effected by the conductive coupling between the touch region and the band segments when the touch region is moved into contact with the band segments and wherein the controller is adapted to identify multiple locations on the touch region which are simultaneously touched upon movement of the cover layer into contact with the touch region at the multiple locations;

sequentially energizing a plurality of the segments;
monitoring the electrical characteristics of the touch sensor, and
identifying the locations at which multiple touch positions on the touch region are touched from the monitored electrical characteristics.

25. A method according to claim 24 in which regions-of-interest are selected simultaneously using a plurality of simultaneous touches.

26. A method according to claim 25 which further allows operations to be activated with additional simultaneous touches.

27. A method according to claim 24 that allows an operator to input data to an electronic device without requiring the operator to look at the placement of the fingers.

* * * * *